United States Patent [19]
Phillips et al.

[11] 3,852,396
[45] Dec. 3, 1974

[54] 2-CHLOROVINYL ETHYL ISOPROPYL PHOSPHORAMIDATE AND 2-CHLOROVINYL ETHYL DIETHYL PHOSPHORAMIDATE

[75] Inventors: Donald D. Phillips, Westfield, N.J.; Loyal F. Ward, Jr., deceased, late of San Jose, Calif. by Melba L. Ward, executrix

[73] Assignee: Shell Oil Company, Houston, Tex.

[22] Filed: Feb. 5, 1973

[21] Appl. No.: 329,910

[52] U.S. Cl............ 260/957, 260/969, 260/247.7 R, 424/210
[51] Int. Cl............................ C07f 9/22, A01n 9/36
[58] Field of Search........................................ 260/957

[56] References Cited
UNITED STATES PATENTS
2,927,122   3/1960   Schrader............................ 260/957
3,652,742   3/1972   Sirrenberg et al.................. 260/957

Primary Examiner—Anton H. Sutto

[57] ABSTRACT

Monochlorovinyl-substituted phosphorus compounds of the general formula

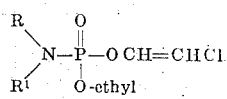

where R and R$^1$ are defined hereinafter, are useful as nematicides and insecticides.

2 Claims, No Drawings

2-CHLOROVINYL ETHYL ISOPROPYL PHOSPHORAMIDATE AND 2-CHLOROVINYL ETHYL DIETHYL PHOSPHORAMIDATE

FIELD OF THE INVENTION

This invention relates to novel monochlorovinyl-substituted phosphorus compounds and to their use as insecticides.

SUMMARY OF THE INVENTION

It has now been found that two monochlorovinyl-substituted phosphorus compounds of Formula I

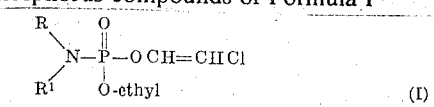

(I)

namely, 2-chlorovinyl ethyl isopropylphosphoramidate (R=H, R$^1$=isopropyl) and 2-chlorovinyl ethyl diethylphosphoramidate (R=ethyl, R$^1$=ethyl) are nematicidal and insecticidal compounds with outstanding properties and have been found to be particularly effective in a soil environment.

The preparation of the compounds of this invention is illustrated in detail in the following examples for the purpose of fully providing the procedure used to obtain the compounds. In the examples below, the structure of the products was confirmed by elemental and infrared analyses.

EXAMPLE 1

Preparation of 2-chlorovinyl ethyl diethylphosphoramidate a. Preparation of diethyl chlorophosphite To 498 grams of triethyl phosphite was added about 10 percent of 206.3 grams of phosphorus trichloride and, after stirring for 20 minutes, the remaining phosphorus trichloride was added portionwise over a period of 45 minutes at a temperature up to 42°C. The reaction mixture was then heated at 80° to 100°C for 1 hour, allowed to stand overnight, and distilled quickly at 200 Torr at a temperature below 70°C to give 577 grams of clear liquid. This liquid was redistilled at 40 Torr and up to 77°C to give 94.4 grams of liquid. The remainder was distilled through an Oldershaw 20-plate column at a reflux ratio of 3:1 to give 372.5 grams of colorless product boiling at 68°–71°C at 32 Torr, representing a 53 percent yield of diethyl chlorophosphite.

b. Preparation of diethyl diethylphosphoramidite

To a solution of 350 grams diethylamine in 2 liters ether was added a solution of 349 grams diethyl chlorophosphite (prepared as in (a) above and diluted with ether to 500 milliliters) at a temperature of 0°–10°C over a period of 30 minutes. The reaction mixture was stirred for two additional hours and then filtered to remove the amine salt. The solvent was removed from the filtrate to give a liquid which was distilled to give 314.4 grams (76 percent of the theoretical yield) of colorless diethyl diethylphosphoramidite, boiling at 63° to 70°C at 4 Torr.

c. Preparation of 2-chlorovinyl ethyl diethylphosphoramidate

To 314 grams of diethyl diethylphosphoramidite (prepared as in (b) above), 190 grams of dichloroacetaldehyde was added dropwise at a temperature of 40°–50°C over a period of 35 minutes with occasional cooling. The reaction mixture was stirred for an additional hour, then stripped of low boiling material and distilled to give (A) 191.7 grams of a tan liquid boiling at 88°–96°C at 0.1 Torr and having 83.8 percent purity by gas liquid chromatography (GLC) analysis and (B) 49.6 grams of a tan liquid boiling at 96°C at 0.1 Torr and having 92.1 percent purity by GLC analysis, representing a 61 percent total yield of 2-chlorovinyl ethyl diethylphosphoramidate.

EXAMPLE 2

Preparation of 2-chlorovinyl ethyl isopropylphosphoramidate a. To a solution of 300 grams of isopropylamine in 2 liters ether was added dropwise with vigorous stirring over a period of one hour 372.5 grams of diethyl chlorophosphite (prepared as in 1(a) above) at a temperature of −5° to +5°C. After two additional hours during which time the reaction mixture was not cooled, the reaction mixture was filtered to remove the amine salt. The solvent was removed from the filtrate to give 521 grams of a crude product which was distilled to yield (A) 351.8 grams of product boiling at 52°–58°C at 4 Torr and (B) 46 grams of residue. GLC analysis indicated that (A) was about 97 percent and (B) was about 70 percent of the desired O,O-diethyl isopropylphosphoramidite.

b. To 324 grams of O,O-diethyl isopropylphosphoramidite (prepared as in (a) above), 205 grams of dichloroacetaldehyde was added dropwise over a period of 45 minutes at a temperature of 40° to 45°C with stirring and occasional cooling. The reaction mixture was stirred for an additional hour and then distilled to give 254.5 grams of light tan product boiling at 116°–122°C at 0.4 Torr and having 80 percent purity by GLC analysis, representing a 63 percent yield of 2-chlorovinyl ethyl isopropylphosphoramidate.

The phosphoramidates of this invention have been found to be effective in the protection of plants from the harmful effect of nematodes — that is, the unsegmented roundworms of the class *Nematoda*, also known as eelworms, which customarily inhabit soil and feed upon the roots of plants growing therein.

EXAMPLE 3

The phosphoramidates of the invention were thoroughly mixed in varying concentrations with soil infested with the root-knot nematode *Meloidogyne incognita acrita*. Using standard procedures, their efficacy in controlling root-knot nematodes in tomatoes was determined as compared to an untreated control. Two tests were run; one in which the treated soil was planted immediately with the tomato seeds and one in which the soil was held 2 weeks. The dosages used and the per cent control of nematodes obtained at each dosage of each of the test compounds are set out in Table I.

TABLE I.—PERCENT CONTROL OF ROOT-KNOT NEMATODES

| Compound $\begin{array}{c}R\\ \diagdown\\ R^1\end{array}\!\!N\!\!-\!\!\overset{\overset{\displaystyle O}{\|}}{\underset{\displaystyle OR^2}{P}}\!\!-\!\!OCH\!\!=\!\!CHCl$ | | | Dosage rate, parts per million | | | | | | | |
|---|---|---|---|---|---|---|---|---|---|---|
| | | | 0-week hold time | | | | 2-week hold time | | | |
| R | R$^1$ | R$^2$ | 20 | 10 | 5 | 1 | 20 | 10 | 5 | 1 |
| C$_2$H$_5$ | C$_2$H$_5$ | C$_2$H$_5$ | 100 | 100 | 100 | 92 | 100 | 100 | 86 | 86 |
| iso-C$_3$H$_7$ | H | C$_2$H$_5$ | 100 | 100 | 100 | 70 | 100 | 93 | 86 | 96 |

The phosphoramidates of this invention demonstrate insecticidal activity and are particularly effective in controlling insects in the soil and on plants. For example, a solution of 0.015 percent 2-chlorovinyl ethyl diethylphosphoramidate kills 92 percent of all cabbage loopers when applied to leaves infested with these insects. In addition, 2-chlorovinyl ethyl diethylphosphoramidate has demonstrated its usefulness in killing banded cucumber beetle in the soil. Its activity in the soil for the control of wireworms in sugar beet and maize is comparable to the activity of Aldrin, Dyfonate, and Birlane/Parathion mixture.

EXAMPLE 4

Insecticidal activity of the phosphoramidate compounds of this invention was tested by the appropriate means. The results of the tests are reported in Table II wherein the letter designations A, B, and C represent complete kill, partial kill, and no kill, respectively, and the numerical values represent the ratio of the activity of the compound tested as compared to parathion.

vents that may be used in the preparation of these compositions include both polar and non-polar aliphatic and aromatic solvents including, for example, benzene, toluene, xylene, naptha, dimethylformamide, carbon tetrachloride, acetone, methyl ethyl ketone, ethanol, propanol, butanol, dioxane, and mixtures thereof.

Granules containing about 5 percent active ingredient were prepared by dissolving the phosphoramidate in either acetone or methylene chloride solution. High aromatic naptha is added to increase the density of the solution and to reduce the dustiness of the granules. This solution is then sprayed on tumbling granules of Celatom and the solvent evaporated by drying. Examples of the formulations prepared by this method are shown below:

Formulation A
6.3%    2-Chlorovinyl ethyl diethylphosphoramidate
20%    High aromatic naptha
73.7%    Celatom — 78 (calcined diatomaceous silica aggregate sold by Eagle-Pitcher)

Formulation B
6.3%    2-Chlorovinyl ethyl isopropylphosphoramidate
20%    High aromatic naphtha
73.7%    Celatom — 78

TABLE III.—INSECTICIDAL ACTIVITY

Compound $$\begin{array}{c} R \\ \phantom{R}\diagdown \\ \phantom{RR}N-P-OCH=CHCl \\ \phantom{R}\diagup \phantom{-}| \\ R^1 \phantom{--} O \\ \phantom{RRR} R^2 \end{array} \quad \begin{array}{c} O \\ \| \\ \\ \\ \\ \end{array}$$

| R | $R^1$ | $R^2$ | $M.d.^1$ | $A.a.^2$ | $P.c.^3$ | $P.m.^4$ | $P.b.^5$ | $M.v.^6$ | $T.u.^7$ | $P.a.^8$ | $E.W.^9$ | $S.M.^{10}$ | $A.a.(La.)^{11}$ | $B.C.^{12}$ | $C.I.^{13}$ |
|---|---|---|---|---|---|---|---|---|---|---|---|---|---|---|---|
| $C_2H_5$ | $C_2H_5$ | $C_2H_5$ | 42 | C | 10 | 8 | 6 C | | 8 | 4 | 14<3 | <5 | 1 | 14 | |
| iso-$C_3H_7$ | H | $C_2H_5$ | 60 | C | B | | | 24 | 6.6 | 61 | 29 | 4 | 127 | 13 |

The phosphoramidates of this invention may, if desired, be applied as such to the locus to be treated. Ordinarily and preferably, however, these compounds are used in combination with an inert agriculturally acceptable diluent or carrier to make it easier to measure accurately and to apply evenly the small amounts of the insecticide that are required to control insect activity as well as to apply them in a form that will be readily dispersed through the soil. These compounds can be mixed or deposited upon inert particulate solids, such as fullers earth, talc, diatomaceous earth, natural clay, kaolin, walnut shell flour, and the like, to form dry particular compositions. Such compositions may be employed as dusts, or they may, if desired, be dispersed in water with or without the aid of a surface-active agent. Alternatively, the dry compositions may be formed into granules or pellets by known techniques.

The phosphoramidates may be dispensed in the form of solutions or dispersions in inert organic solvents or in mixtures of inert organic solvents and water. The sol- The method of applying the compositions of this invention comprises applying a phosphoramidate, ordinarily in a composition of one of the aforementioned types, to a locus or area to be protected from insects. The active compound, of course, is applied in amounts sufficient to exert the desired action.

The amount of the phosphoramidate to be used in controlling insects will naturally depend on the formulation used, the mode of application, the climate, the season of the year, the particular insect to be controlled, and other variables. Recommendations as to precise amounts are, therefore, not possible. In general, however, application to the locus to be protected of from one to twenty and preferably three to ten pounds per acre of the phosphoramidates of this invention will be satisfactory.

We claim as our invention:
1. 2-Chlorovinyl ethyl isopropylphosphoramidate.
2. 2-Chlorovinyl ethyl diethylphosphoramidate.

\* \* \* \* \*

Dedication 3,852,396.—*Donald D. Phillips*, Westfield, N.J. and *Loyal F. Ward, Jr.*, deceased, late of San Jose, Calif., by Melba L. Ward, executirix. 2 - CHLOROVINYL ETHYL ISOPROPYL PHOSPHORAMIDATE AND 2-CHLOROVINYL ETHYL DIETHYL PHOSPHORAMIDATE. Patent dated Dec. 3, 1974. Dedication filed May 14, 1980, by the assignee, *Shell Oil Company*.

Hereby dedicates to the Public the entire remaining term of said patent.

[*Official Gazette July 8, 1980.*]